United States Patent
Goodnick et al.

(10) Patent No.: US 6,617,731 B1
(45) Date of Patent: Sep. 9, 2003

(54) ROTARY PUMP WITH BEARING WEAR INDICATOR

(75) Inventors: Douglas J. Goodnick, Niagara Falls, NY (US); Patrick R. Linehan, Lancaster, NY (US); Joseph D. Reasinger, Tonawanda, NY (US)

(73) Assignee: Buffalo Pumps, Inc., North Tonawanda, NY (US)

( * ) Notice: Subject to any disclaimer, the term of this patent is extended or adjusted under 35 U.S.C. 154(b) by 0 days.

(21) Appl. No.: 10/161,663

(22) Filed: Jun. 5, 2002

(51) Int. Cl.$^7$ .................................................. H02K 7/08
(52) U.S. Cl. ........................................ 310/90; 384/624
(58) Field of Search .............................. 310/90, 68 R; 384/624; 340/682, 683

(56) References Cited

U.S. PATENT DOCUMENTS

| | | | |
|---|---|---|---|
| 3,195,466 A | | 7/1965 | Young .......................... 417/357 |
| 3,225,698 A | | 12/1965 | Spisiak ........................ 417/369 |
| 3,433,164 A | | 3/1969 | Neal ........................ 417/423.12 |
| 3,624,704 A | * | 11/1971 | Leonard, Jr. .................. 62/296 |
| 4,063,786 A | * | 12/1977 | Rall ............................ 384/448 |
| 4,237,454 A | | 12/1980 | Meyer ......................... 340/682 |
| 4,641,978 A | * | 2/1987 | Kapich ........................ 384/102 |
| 4,726,694 A | * | 2/1988 | McFarlin et al. ........... 384/119 |
| 5,244,287 A | * | 9/1993 | Yoshikawa ................... 384/448 |
| 5,451,110 A | * | 9/1995 | Gams et al. ................. 384/624 |
| 5,602,437 A | * | 2/1997 | Shahamat et al. ............ 310/90 |
| 5,796,349 A | * | 8/1998 | Klein .......................... 340/682 |
| 5,944,489 A | | 8/1999 | Vaughn ...................... 417/44.1 |

OTHER PUBLICATIONS

Buffalo Pumps C–O–"R"™ Sealless Design Refrigerant Ammonia R–22 $CO_2$ Brines, Jun. 5, 2002.
Buffalo Pumps Buffalo CAN–O–MATIC II—Reliable Zero Leakage Pumps, Jun. 5, 2002.
Specification Sheets—For Vibration Transmitter (162 VTRA), Mar. 13, 2002.
Specification Sheets—Vibration Switches (440), Mar. 13, 2002.

* cited by examiner

Primary Examiner—Dang Dinh Le
(74) Attorney, Agent, or Firm—Fay, Sharpe, Fagan, Minnich & McKee (57) ABSTRACT

A rotary pump for liquid having a housing, a shaft carrying a motor rotor, a motor stator fixed in the housing and surrounding the rotor to rotate the rotor and shaft about an axis. The shaft is mounted in the pump housing by axially spaced conical bearings, each bearing including a first element fixed on the shaft with a first conical bearing surface concentric with the axis, a coacting second element carried by the housing with a second conical bearing surface concentric with the axis and slidably engaging the first bearing surface and a spring forcing the elements together. This pump includes a wear indicator comprising: a first drive member on the shaft, an imbalance member carried with the second element of a bearing with a second drive member aligned with the first member and movable axially toward the first drive member as the bearing surfaces wear so the first and second drive members engage when the imbalance member moves axially a given distance. A sensor detects vibrations caused by rotation of the imbalance member by the shaft.

34 Claims, 6 Drawing Sheets

ROTARY PUMP WITH BEARING WEAR INDICATOR

The present invention relates to a rotary pump for liquid and more particularly to a rotary pump of the immersed rotor type with a bearing wear indicator.

INCORPORATION BY REFERENCE

The present invention is particularly applicable to a liquid rotary pump where the liquid immerses the motor rotor that is isolated from the motor stator by a shield, often referred to as a "can" or "jacket." This type of pump has been manufactured for many years and includes a shaft for rotatably mounting the rotor of the motor driving the pump. To center the rotor in the pump housing it has proven quite beneficial to use a mechanism having axially spaced conical bearings. Such a pump and bearings are disclosed in Young U.S. Pat. No. 3,195,466. Conical shaft bearings not only center the rotor and maintain the axial position of the pump impeller, but also provides the friction surfaces between the pump housing and the rotating elements within the pump. Young U.S. Pat. No. 3,195,466 is incorporated by reference as background information so that the details of the particular pump and bearings to which the present invention is directed need not be repeated by merely describing known pump technology. Through the years, patents have issued directed toward mechanical changes in the immersed rotor type of liquid pump. Two of these patents are Spisiak U.S. Pat. No. 3,225,698 and Neal U.S. Pat. No. 3,433,164. These patents are also incorporated by reference herein as background pump technology that need not be repeated in describing and understanding the present invention. The rotary pump to which the present invention is specifically directed is an improvement or modification of an existing pump sold by Buffalo Pumps of North Tonawanda, N.Y. The interior design of the preferred embodiment is the same as the pumps marketed by Buffalo Pumps for some years. This well known design is disclosed in Buffalo Pumps Bulletins 929A and 985, which bulletins are incorporated by reference herein to show how the pump to which the present invention is directed employs the patented background technology. These bulletins also disclose the fluid thrust balancing mechanism used in some of the immersed rotor pumps, but this feature does not constitute a feature of the present invention. All of this background material shows use of axially spaced conical bearings for supporting the immersed rotor of a rotary pump.

The present invention relates to a wear detector using a vibration member for activation when wear of the conical bearings reaches a certain limit. A wear detector is shown in Vaughn U.S. Pat. No. 5,944,489; however, it relates to another sensing mechanism and is not associated with conical bearings. Sensing of bearing vibration is disclosed in Meyer U.S. Pat. No. 4,237,454. This patent relates to the actual vibration caused by the defective bearing and not a mechanism to cause vibration. These two patents are incorporated by reference herein.

The present invention involves a mechanism causing the housing of a pump to violently vibrate when there is excessive bearing wear. This vibration is detected by a device involving a model 162 VTRA vibration transmitter on the housing. The transmitter is connected to a series 440 vibration switch. The lights on the transmitter indicate when the vibration device has been triggered by rotation of the internal wear detector. Incorporated by reference herein are specification sheets for the vibration transmitter (162 VTRA) and the vibration switch (440) contemplated for use in practicing the present invention.

BACKGROUND OF INVENTION

The immersed rotor type rotary pump which has proven to be the most successful through the years includes axially spaced conical bearings. These conical bearings each have a journal element that is self lubricating carbon graphite with an internal taper and mounted for radial movement in the pump housing. The internal taper or conical bearing surface of the journal or second element of the bearing matches the tapered or conical bearing surface of a first element formed as part of the shaft of the immersed motor rotor. In this type pump stainless steel coil springs in the journal recess of the pump housing forces the axially movable bearing elements or journals toward the fixed matching elements on the rotor shaft. Thus, from both ends of the rotor, a coil spring biases the two journal elements of the spaced conical bearings into engagement with the shaft elements to provide a bearing force that maintains the radial position of the rotating rotor. In addition, the conical bearings have a force component that maintains the axial position of the rotor within the pump housing. Consequently, the conical bearings which have been used for decades are quite successful and constitute an inexpensive mechanism to maintain self-centering of the rotor for control of both the radial and axial positions of the rotating components of the pump. During bearing wear, the matching conical bearing surfaces maintain the radial position of the rotating components of the pump. In addition, one beneficial feature of using conical bearings is that the bearings have a self-centering ability in an axial direction based upon the liquid pressure around the rotor. The thrust balancing feature uses a pressure differential between the front of the rotor and the back of the rotor so that the hydraulic forces move the conical bearings slightly to center the rotor. This balancing is accomplished by spring biased conical bearings.

The conical bearings that are spring biased have an initial axial position after thrust balance, which position should be maintained over long term use of the pump. When the conical bearings have reached approximately ⅛ inch of wear, it is desirable to replace or repair the journals of the pump bearings to maintain trouble free operation. Wear of the conical bearings is normally discovered during regular inspection involving disassembly of the pump. However, it is desirable to know when bearing wear reaches a given amount for the purposes of tending to proper preventive maintenance. At this time, rotary pumps of the immersed rotor type are subject to periodic maintenance or inspection. The time between such inspections must be quite short to assure maintenance is performed before the pump fails due to excessive bearing wear. Catastrophic bearing failure must be avoided. Bearing wear can be accelerated by the type of fluid being pumped or by contaminants in the pumped liquid. Consequently, it is preferred practice to inspect the conical bearings long before they need to be refurbished to assure long term operation of the pump. These factors make maintenance of conical bearings a relatively expensive and time consuming activity.

THE INVENTION

The present invention relates to the concept of detecting wear of the conical bearings to determine when they should be replaced and/or refurbished. Consequently, frequent inspection of the bearings is not necessary. Bearings are given attention only when actually needed. This is a substantial advantage, is cost effective and prevents catastrophic failure based upon bearing malfunction. In the past, such failure could occur between even short term inspections. The invention involves an improvement in a rotary pump of the type described and incorporated by reference herein. Real time monitoring of the conical bearing wear is the result of using the invention. An excessive wear detecting device uses an imbalance member that is associated with each of the axially spaced conical bearings. The imbalance ring or plate (i.e. member) surrounds the shaft and includes a drive member axially spaced outwardly from a drive member on the rotating shaft. As the bearing being monitored is subject to wear, the two drive members move together and ultimately engage. This causes the shaft to rotate the imbalance member to drastically increase the vibration of the pump housing. A sensor detects the drastic increase in the housing vibration to indicate bearing wear at a monitored amount. During operation of the pump the conical bearings and the rotor assembly move axially to maintain the hydraulic thrust balance as previously described. This balanced axial position allows the housing to carry the imbalance member without rotation by the shaft. As the conical bearings wear, the drive members on the imbalance element and the shaft move axially toward each other. When there is a given amount of wear, the imbalance member carried by the bearing element on the housing is engaged by the shaft drive element and starts to rotate. In this manner, the present invention provides a mechanical event indicating when bearing wear is at a given amount. The change in spacing bearing journals is indicative of a need to replace the bearings or otherwise attend to the bearings in the pump. The wear detecting device of the present invention is easily installed on existing canned pump designs. There is no need to modify the pump pressure boundary to disturb the integrity of zero leakage designs. A wear detector imbalance member is merely assembled in the housing of the pump adjacent each of the conical bearings and an engaging element is fixed on the shaft. The wear characteristics of the bearings are monitored by action of these two components.

In accordance with the present invention, there is provided a rotary pump for liquid. The pump has a housing, a shaft carrying a motor rotor, a motor stator fixed in the housing and surrounding the rotor to rotate the rotor and shaft about an axis. The shaft is mounted in the housing by axially spaced conical bearings, each bearing includes a first element fixed on the shaft with a first conical bearing surface concentric with the rotational axis, a coacting second element carried by the housing with a second conical bearing surface centered with the axis and slidably engaging the first bearing surface and a spring forcing the two elements together to center the rotor with respect to the stator. The invention involves a wear indicator comprising a cage attached to and movable axially with the second element of one of the bearings as the bearing surfaces wear. This cage surrounds the shaft and carries an imbalance plate or ring with an outer portion supported on the cage for free rotation in the cage and an inner portion surrounding, but normally spaced from the shaft. There is a first drive member fixed on the shaft and a second drive member on the plate or ring and axially aligned with the first drive member so the members engage each other when the cage moves axially a given distance whereby the imbalance plate or ring is rotated in the cage by the shaft. Rotation of this imbalance plate or ring causes drastic vibration, which vibration is sensed on the motor housing to indicate wear of a given amount by the internal conical bearing or bearings. In accordance with another aspect of the invention, a given distance of wear is ¼–⅛ inch, and preferably about ⅛ inch. The first drive member is a tapered nose on a sleeve mounted to rotate with the shaft. The second drive member is a tapered opening in the imbalance plate or ring that surrounds the tapered nose. As these two members move together upon bearing wear, they ultimately engage. The two tapered surfaces rotate the imbalance member, plate or ring to cause drastic vibration of the pump housing. This vibration is sensed to indicate undue wear of at least one of the bearings. In accordance with an aspect of the invention, the imbalance plate, ring or member is a wheel like element with a substantially different mass at one circumferentially spaced areas. Rotation of this member causes drastic vibration. In accordance with an aspect of the invention, the cage is forced against the second element by the spring.

The primary object of the present invention is the provision of a rotary liquid pump of the type having spaced conical bearings, which pump is provided with a wear indicator of the type having an imbalance element or member engaged and rotated by the shaft for signaling excessive bearing wear.

Still a further object of the present invention is the provision of a rotary pump as defined above, which pump incorporates a commercial vibration detector mounted on the housing. When this detector senses unusually violent vibrations, a signal is provided to indicate bearing wear.

Yet another object of the present invention is the provision of a rotary pump, as defined above, which pump is the sealed stator type and includes the wear indicator that is easily mounted on existing immersed rotor rotary pumps.

These and other objects and advantages will become apparent from the following description taken together with the accompanying drawings.

PREFERRED EMBODIMENT

Figure 1:
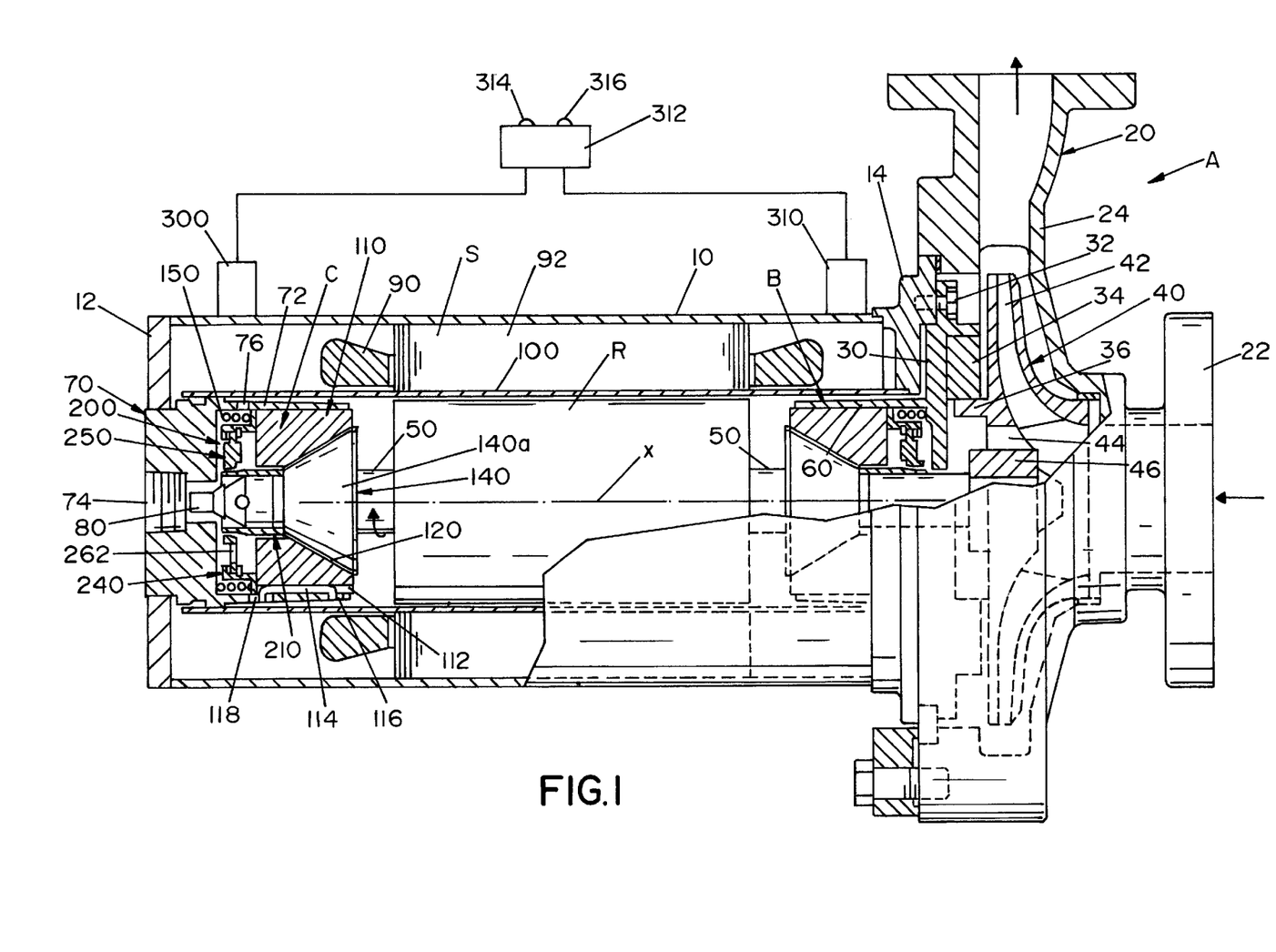
FIG. 1 is a partially cross-sectioned side view of a rotary pump incorporating the present invention.

Referring now to the drawings wherein the showings are for the purpose of illustrating the preferred embodiment of the present invention and not for the purpose of limiting same, FIG. 1 shows a rotary pump A with a vibration inducing bearing wear monitoring assembly installed on each of the conical bearings B and C. A simple base line pump vibration measurement during the initial start up is required. This gives the normal vibration level for pump A. Periodic monitoring of the pump will indicate by means of increased vibration readings when conical bearings B and C require inspection or replacement. As will be explained later, a vibration cage assembly, which is constructed of a non-corrosive material, is installed between each of the standard coiled springs and the conical bearings B and C while a tapered sleeve is fitted over the shaft. An imbalance member floats freely within the cage assembly while the bearings maintain axial balance. As the conical bearing wears, one element moves toward the other element with the imbalance member being carried thereby. When ⅛ inch of wear has occurred, the imbalance member in the cage assembly engages the tapered sleeve to be rotated by the shaft to produce an increased measurable vibration. This increased vibration is indicative that one bearing at least needs replacement or maintenance. The cage assembly is designed to be easily installed in any canned pump design. The cage is installed inside the motor between the spring and conical bearing and the tapered sleeve is pressed fit on the end of the rotor shaft. No modification of the motor is necessary. This maintains the integrity of the zero leakage design. A full time vibration monitor unit in the form of a transistor and switch is an option for constant monitoring of the pump, if necessary. Each bearing has its own cage assembly so that wear of the individual bearings is detected. In accordance with the general concept, the housing vibration indicates wear of a conical bearing. To monitor this vibration, the transmitter and/or switch is employed. This is a general description of the operation of the preferred embodiment illustrated in FIG. 1.

In accordance with standard technology, the immersed rotor pump A includes a motor housing 10 with cast end plates 12, 14. At the end of housing 10 is an impeller housing 20 having liquid inlet 22 and liquid outlet 24. Within housing 20, bearing mounting plate 30 is affixed to end plate 14 by bolts 32. Low friction guide ring 34 centers impeller 40 in mounting plate 30 by rim 36 for rotation in housing 20. Vanes 42 of the impeller propel liquid from inlet 22 through outlet 24. Liquid bypass or pressure equalizing ports 44 allow liquid pressure in the impeller area to be distributed into the interior of the pump housing. Hub 46 of impeller 40 supports the impeller on the outermost end of shaft 50 for rotation about axis x. This rotational axis of shaft 50 is controlled by spaced conical bearings B, C, each of which is substantially the same in construction but facing in opposite directions with respect to shaft 50. Bearing B is assembled into cylindrical receiver 60 of bearing mounting plate 30. Conical bearing C is assembled into mounting hub 70 in end plate 12. Hub 70 has inwardly facing cylindrical receiver 72 concentric with receiver 60 of bearing B. For purposes of a feature not part of the present invention, hub 70 includes a fluid outlet 74 and pressure stabilizing holes 76. These openings act with a thrust balancing tip 80 for the purposes of fluid thrust balancing, a feature of certain rotary pumps but not involved in the present invention.

Pump A includes a motor comprising rotor R and stator S with energizing coils 90 in fixed laminations 92 for the purposes of driving rotor R by an alternating current in the coil 90. In accordance with standard practice, a sleeve or can 100 seals the immersed rotor R from the electrical components of stator S. In this type of pump, liquid through outlets 44 fill the volume defined by can 100 with the tip 80 balancing the actual position of the rotor based upon pressure differentials then the sealed portion of pump A.

Figure 2:
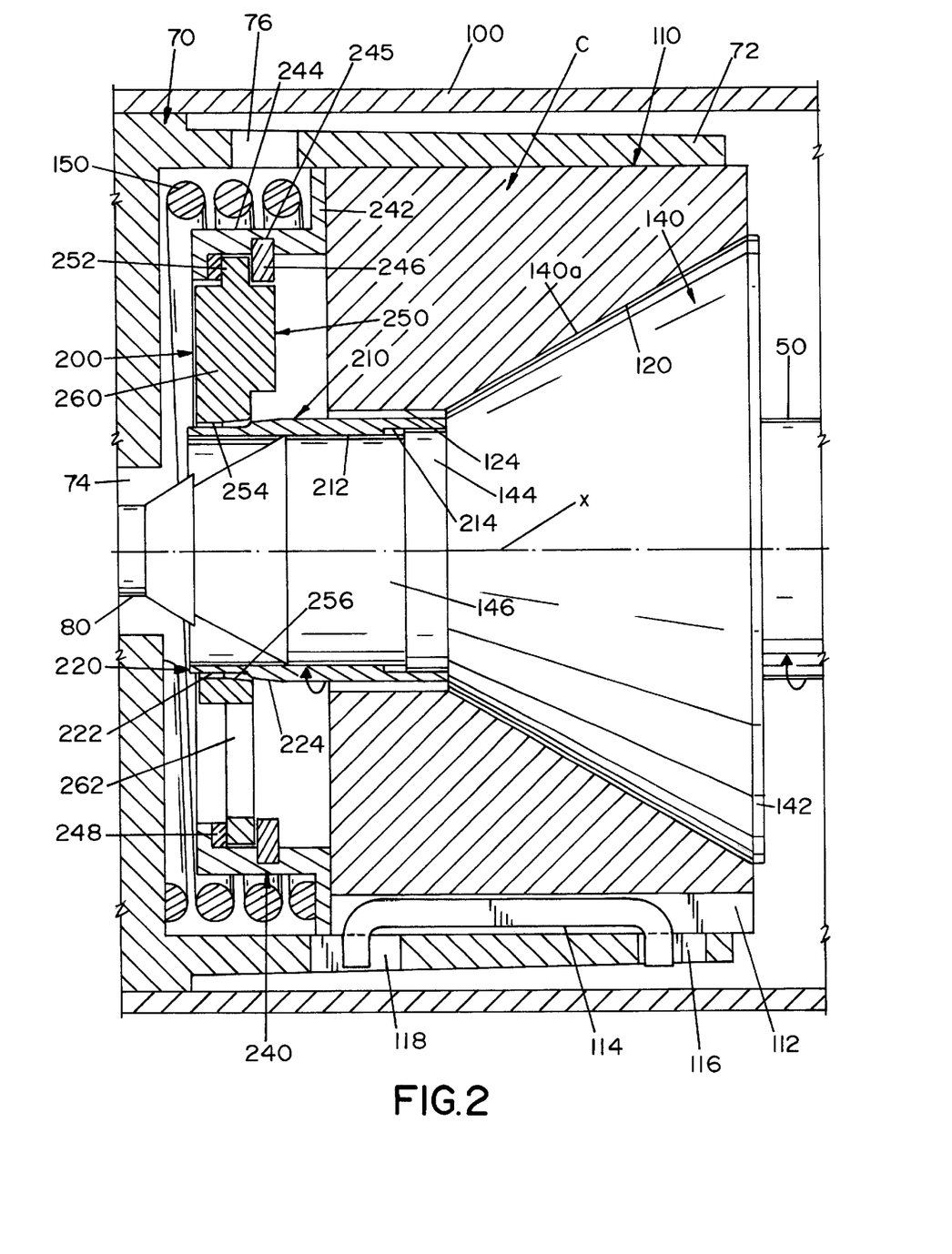
FIG. 2 is an enlarged partially cross-sectioned side view showing the wear detector of the present invention at one bearing before detection of wear.
Figure 3:
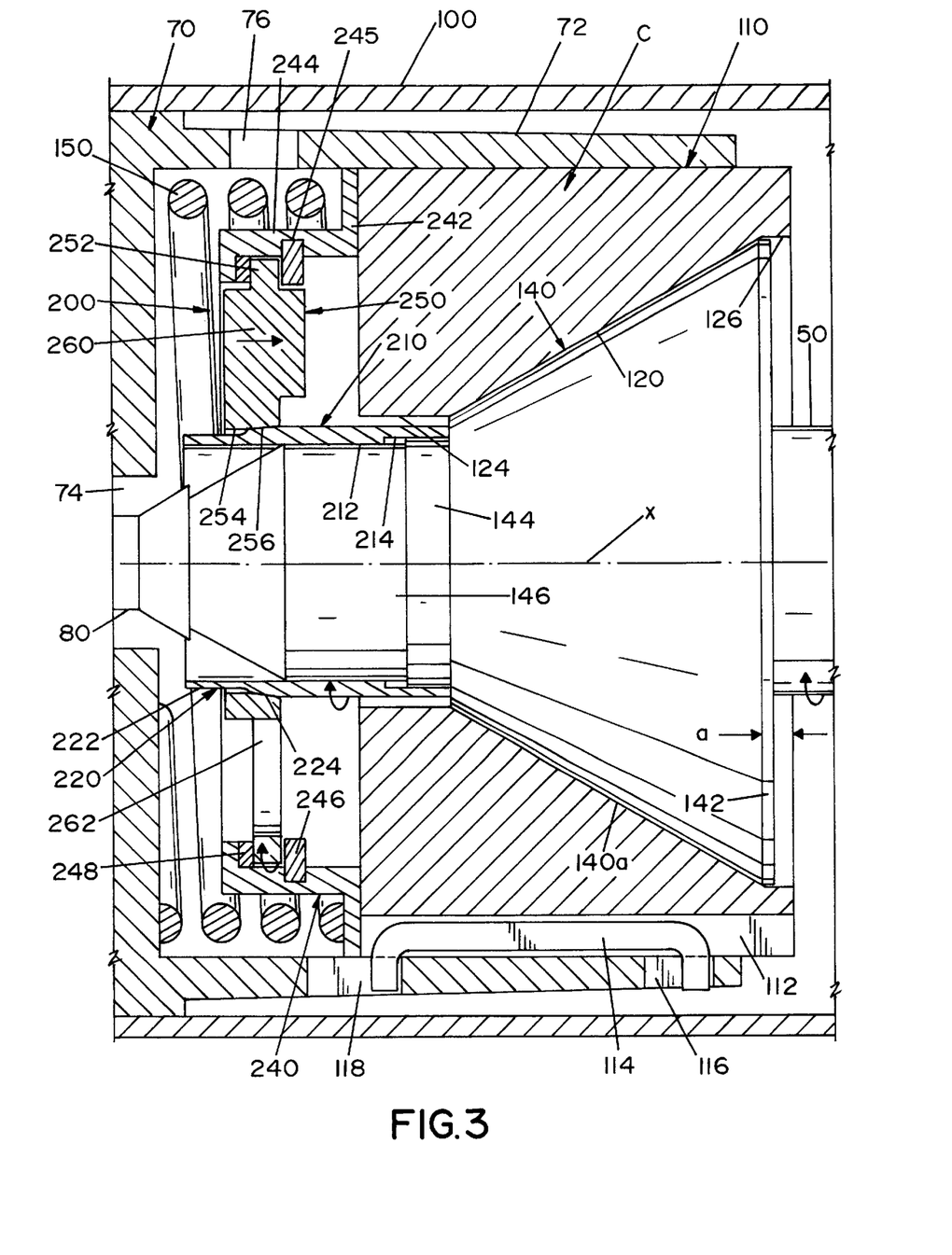
FIG. 3 is a view similar to FIG. 2 wherein the wear indicator is in the position detecting bearing wear.

Conical bearings B and C are essentially the same and are both provided with the invention to detect when the bearings wear to a particular amount, generally in the range of ¼–⅛ inch and preferably about ⅛ inch. Since the conical bearings and the wear detectors or indicators for each bearing are essentially identical, details of bearing C best shown in FIGS. 2 and 3 will be described in detail. This description applies equally to axially spaced conical bearing B. Each conical bearing includes a second element 110 molded or machined from a self-lubricating carbon graphite or other industrial low friction material. In the preferred embodiment, element 110 is cylindrical and mounted in cylindrical receiver 72 of hub 70. To radially fix element 110 with respect to receiver 72, a key way 112 is machined or cast to extend axially of element 110. Metal U-shaped key 114 is mounted in slots 116, 118 and extends into key way 112 so that second bearing element 110 merely moves in an axial direction. Bearing element 110 includes a conical surface 120 formed from the low friction material and concentric with axis x. An outer clearance bore 124 provides clearance for shaft 50 upon which is fixed a first bearing element 140 having a rearward cylindrical rim 142 and a forward reduced cylindrical portion 146. In accordance with standard practice, stainless steel spring 150 pushes element 110 toward element 140 to center shaft 50 for rotation by motor action between stator S and rotor R. This position is fixed by elements 110, 140. The bearings can float to give axial pressure balance. As so far described, pump A is constructed in accordance with the construction of canned immersed rotor type fluid pumps. FIG. 2 shows the two bearing elements as they are initially assembled into the pump. FIG. 3 illustrates the concept of wear between surface 120 and matching conical surface 140a of element 140. During operation, surface 120 wears and it is driven inwardly by spring 150 to create bore 126 caused by rim 142 cutting into element 110 a distance a relating to the amount of wear. This is shown in FIG. 3.

In accordance with the present invention, a wear detector or indicator 200 is associated with each bearing B, C. The detector includes sleeve 210 press fitted on reduced cylindrical portion 146 of shaft 50. Internal diameter portion 212 is press fitted over cylindrical portion 146. Enlarged outer end 214 forms a clearance that fits over rim 144 of the shaft. Sleeve 210 includes an outwardly projecting nose 220 with a cylindrical guide end 222 and a tapered portion 224 having a taper of approximately 5° to give an enlarged rear area which defines a shaft mounted drive member for detector 200. Cage 240 has a generally flat outer ring 242 resting against the outer surface of elements 110. Ring 242 terminates at inner housing 244 having a groove 245 to receive an inner snap ring 246. This ring coacts with non-metallic, low friction ring 248 to capture imbalance plate, member or ring 250 spaced inwardly from housing 244 to be freely rotatable in the housing. Member 250 and housing 244 are, in practice, formed of 316 stainless steel. Ring 248 facilitates free rotation between these stainless steel elements. Outer rim 252 of member 250 is received between the snap ring and stop ring so that the imbalance member is captured in cage 240 by snap ring 246. The inner portion of imbalance member 250 is an inner opening 254 with an inlet taper 256 generally matching taper 224 to form a second drive member. The second drive member is on imbalance member 250. To provide mass imbalance circumferentially around member 250, one area 260 is enlarged and the other area 262 is an opening. As conical bearing C wears, second member 110 is pushed backwardly by spring 150 acting against end ring 242. Thus, cage 240 moves axially to the right as bearing C wears. This movement of the cage carries with it member 250 that has drive member 256 aligned with drive member 224 on the shaft. As these two members move together during wear, they ultimately engage and lock. When this occurs, sleeve 210 on shaft 50 rotates imbalance member, plate or ring 250. This causes drastic vibration of the housing adjacent whichever bearing has worn to engage the two drive members. As shown in FIG. 1, vibration sensor switches 300, 310 pick up the vibration at the bearing and direct the information to transmitter 312 to signal that one or more of the bearings has worn to an unacceptable condition. Transmitter 310 has lights 314, 316 which, in practice, indicates that the bearings are functioning proper or are worn. One light is green, the other light is red for this purpose. In some instances, there is no need for the vibration sensor. The housing of pump A with a worn conical bearing will convey the fact. The imbalance member is rotating due to improper bearing wear. By touch, this mechanical event may be detected.

Figure 4:
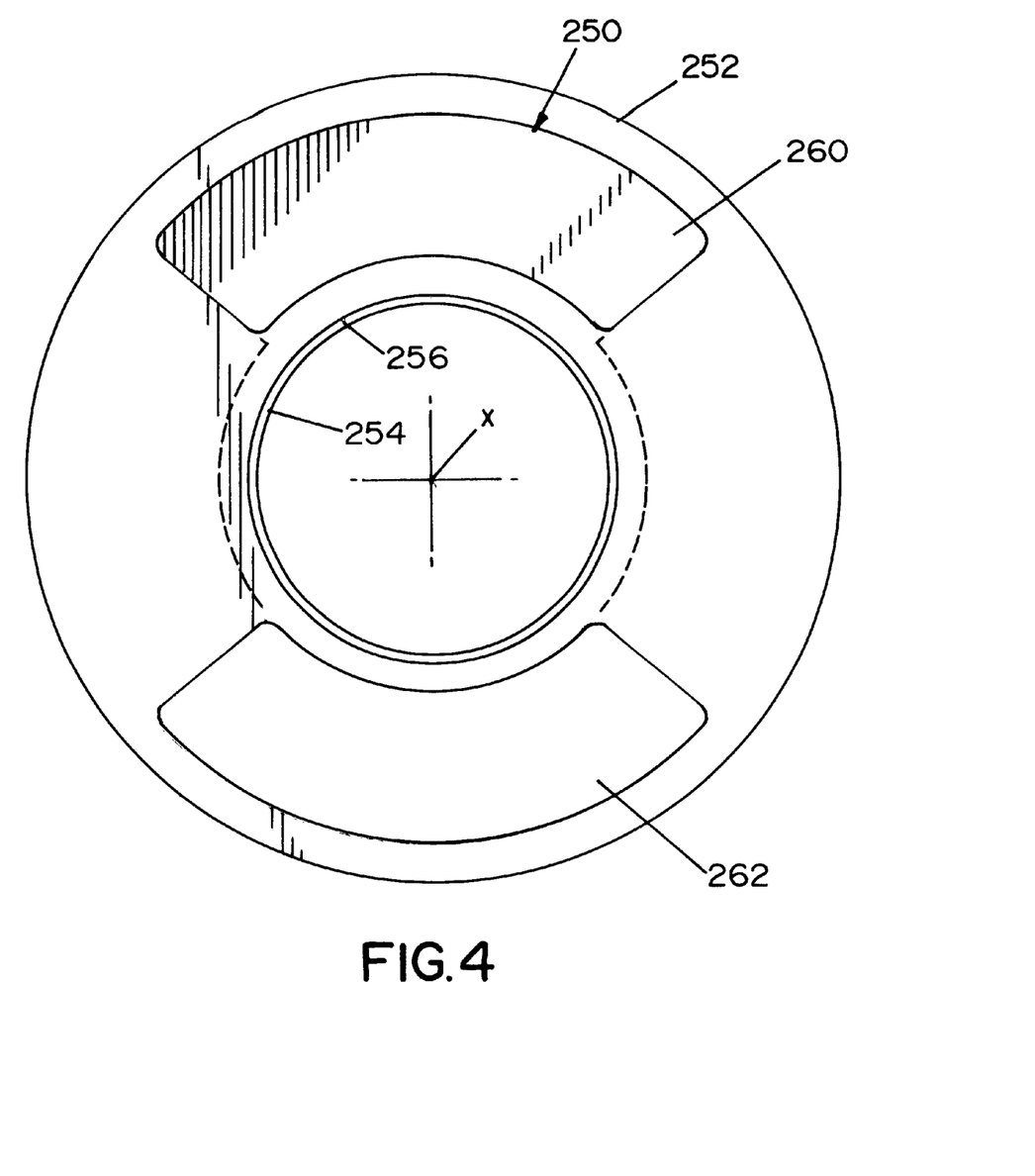
FIG. 4 is a front plan view of the imbalance member, plate or ring employed in the preferred embodiment of the present invention.
Figure 5:
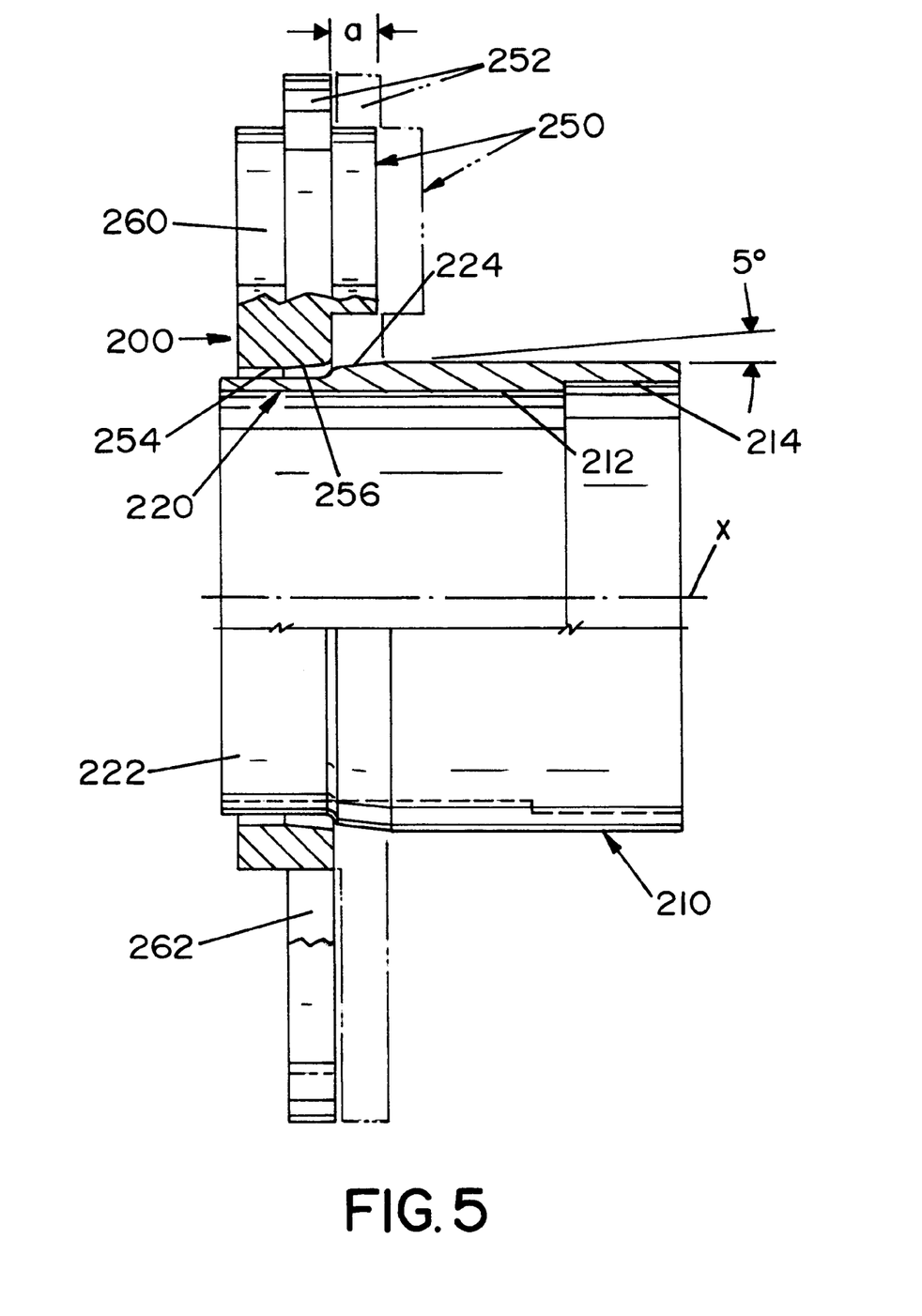
FIG. 5 is a partially cross-sectioned side view of the engageable drive members used in the preferred embodiment of the preferred embodiment of the present invention, with the detection position shown in phantom lines; and, FIG. 6 is an exploded view of the novel wear indicator mechanism for use in a standard rotary pump having spaced conical bearings.
Figure 6:
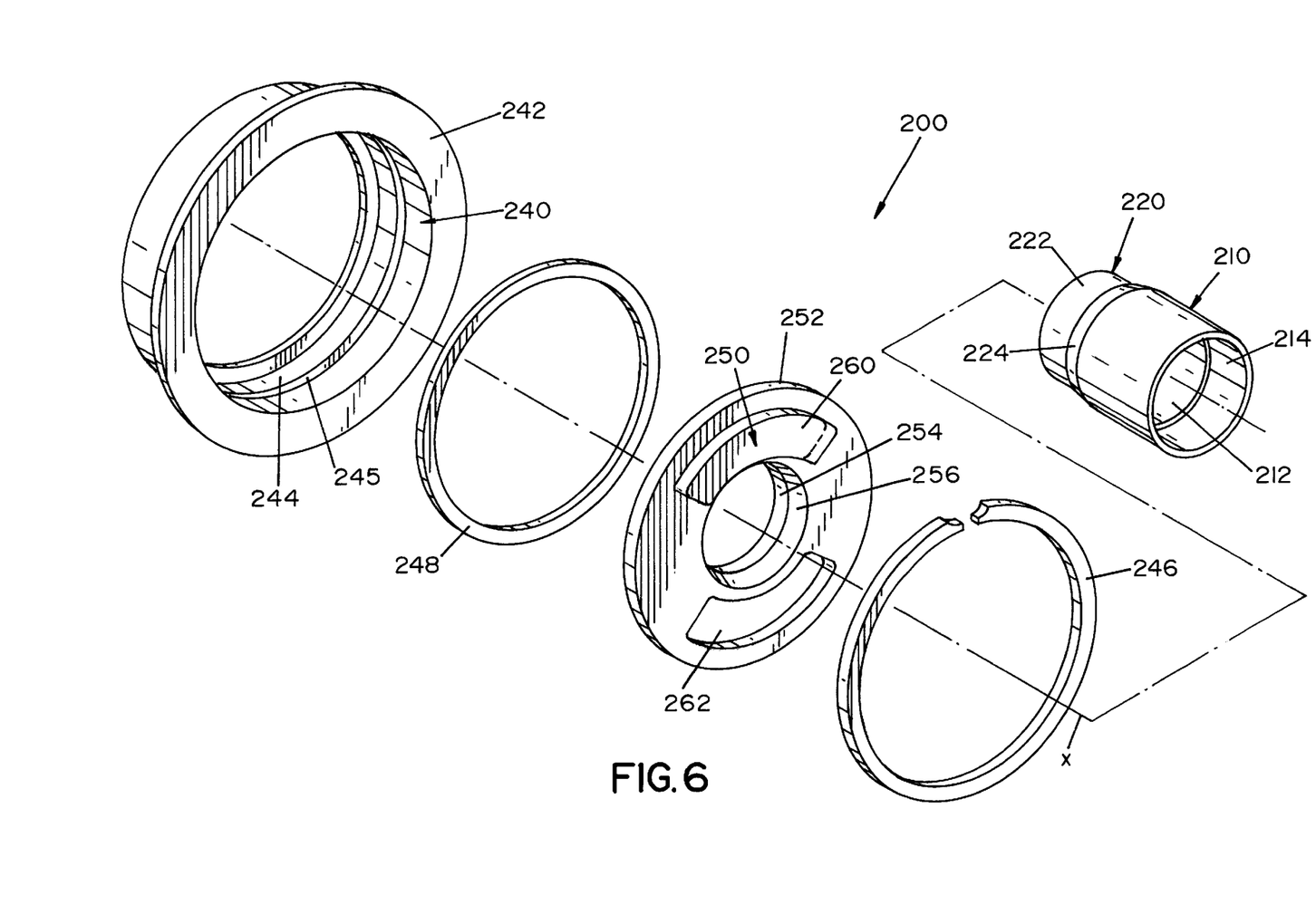

The balance plate or ring is shown in FIG. 4. The inner action between the drive element on the ring and sleeve are shown in FIG. 5. The solid line position of imbalance member 250 is compared to the wear detecting position shown in phantom line. The distance a is the given distance. This distance is shown in FIG. 3. When there is no wear, elements 110, 140 are at a fixed position irrespective of the axial position of the shaft. The wear distance a is a fixed amount gaged by movement between the bearing members. FIG. 6 is an exploded view showing details of the wear detector or indicator 200.

Having thus defined the invention, the following is claimed:

1. A rotary pump for liquid having a housing, a shaft carrying a motor rotor, a motor stator fixed in said housing and surrounding said rotor to rotate said rotor and shaft about an axis, said shaft being mounted in said housing by axially spaced conical bearings, each bearing including a first element fixed on said shaft with a first conical bearing surface concentric with said axis, a coacting second element carried by said housing with a second conical bearing surface concentric with said axis and slidably engaging said first bearing surface and a spring forcing said elements together, said pump including a wear indicator comprising: a cage attached to and movable axially with a second element of a bearing as said bearing surfaces wear, said cage surrounding said shaft and carrying an imbalance plate with an outer portion supported on said cage for free rotation in said cage and an inner portion surrounding but normally spaced from said shaft, a first drive member fixed on said shaft and a second drive member on said plate and axially aligned with said first drive member so said members engage when said cage moves axially a given distance whereby said imbalance plate is rotated in said cage by said shaft.

2. A rotary pump as defined in claim 1 wherein said given distance is ¼–⅛ inches.

3. A rotary pump as defined in claim 2 including a vibration detector mounted on said housing.

4. A rotary pump as defined in claim 3 wherein said first drive member is the tapered nose of a sleeve mounted on said shaft and said second drive member is a tapered opening in said imbalance plate and surrounding said tapered nose.

5. A rotary pump as defined in claim 4 wherein said imbalance plate is a ring with a substantially difference of mass at circumferentially spaced areas.

6. A rotary pump as defined in claim 3 wherein said imbalance plate is a ring with a substantially difference of mass at circumferentially spaced areas.

7. A rotary pump as defined in claim 3 wherein said cage is forced against said second element by said spring.

8. A rotary pump as defined in claim 2 wherein said first drive member is the tapered nose of a sleeve mounted on said shaft and said second drive member is a tapered opening in said imbalance plate and surrounding said tapered nose.

9. A rotary pump as defined in claim 8 wherein said imbalance plate is a ring with a substantially difference of mass at circumferentially spaced areas.

10. A rotary pump as defined in claim 2 wherein said imbalance plate is a ring with a substantially difference of mass at circumferentially spaced areas.

11. A rotary pump as defined in claim 2 wherein said cage is forced against said second element by said spring.

12. A rotary pump as defined in claim 1 including a vibration detector mounted on said housing.

13. A rotary pump as defined in claim 12 wherein said first drive member is the tapered nose of a sleeve mounted on said shaft and said second drive member is a tapered opening in said imbalance plate and surrounding said tapered nose.

14. A rotary pump as defined in claim 13 wherein said imbalance plate is a ring with a substantially difference of mass at circumferentially spaced areas.

15. A rotary pump as defined in claim 12 wherein said imbalance plate is a ring with a substantially difference of mass at circumferentially spaced areas.

16. A rotary pump as defined in claim 12 wherein said cage is forced against said second element by said spring.

17. A rotary pump as defined in claim 1 wherein said first drive member is the tapered nose of a sleeve mounted on said shaft and said second drive member is a tapered opening in said imbalance plate and surrounding said tapered nose.

18. A rotary pump as defined in claim 17 wherein said imbalance plate is a ring with a substantially difference of mass at circumferentially spaced areas.

19. A rotary pump as defined in claim 17 wherein said cage is forced against said second element by said spring.

20. A rotary pump as defined in claim 1 wherein said imbalance plate is a ring with a substantially difference of mass at circumferentially spaced areas.

21. A rotary pump as defined in claim 20 wherein said cage is forced against said second element by said spring.

22. A rotary pump as defined in claim 1 wherein said cage is forced against said second element by said spring.

23. A rotary pump for liquid having a housing, a shaft carrying a motor rotor, a motor stator fixed in said housing and surrounding said rotor to rotate said rotor and shaft about an axis, said shaft being mounted in said housing by axially spaced conical bearings, each bearing including a first element fixed on said shaft with a first conical bearing surface concentric with said axis, a coacting second element carried by said housing with a second conical bearing surface concentric with said axis and slidably engaging said first bearing surface and a spring forcing said elements together, said pump including a wear indicator comprising: a first drive member on said shaft, an imbalance member carried with said second element of a bearing with a second drive member aligned with said first member and movable axially toward said first drive member as said bearing surfaces wear so said first and second drive members engage when said imbalance member moves axially a given distance and a sensor to detect vibrations caused by rotation of said imbalance member by said shaft.

24. A rotary pump as defined in claim 23 wherein said given distance is ¼–⅛ inches.

25. A rotary pump as defined in claim 24 wherein said first drive member is the tapered nose of a sleeve mounted on said shaft and said second drive member is a tapered opening in said imbalance member and surrounding said tapered nose.

26. A rotary pump as defined in claim 25 wherein said imbalance member is rotatably carried in a cage forced against said first member by said spring.

27. A rotary pump as defined in claim 24 wherein said imbalance member is rotatably carried in a cage forced against said first member by said spring.

28. A rotary pump as defined in claim 24 wherein said pump includes a liquid seal between said stator and said rotor with liquid immersing said rotor.

29. A rotary pump as defined in claim 23 wherein said first drive member is the tapered nose of a sleeve mounted on said shaft and said second drive member is a tapered opening in said imbalance member and surrounding said tapered nose.

30. A rotary pump as defined in claim 29 wherein said imbalance member is rotatably carried in a cage forced against said first member by said spring.

31. A rotary pump as defined in claim 29 wherein said pump includes a liquid seal between said stator and said rotor with liquid immersing said rotor.

32. A rotary pump as defined in claim 23 wherein said imbalance member is rotatably carried in a cage forced against said first member by said spring.

33. A rotary pump as defined in claim 32 wherein said pump includes a liquid seal between said stator and said rotor with liquid immersing said rotor.

34. A rotary pump as defined in claim 23 wherein said pump includes a liquid seal between said stator and said rotor with liquid immersing said rotor.

* * * * *